Jan. 20, 1953 H. W. JONES 2,626,069
COLLECTING, TRANSPORTING, AND DUMPING EQUIPMENT
Filed Sept. 26, 1949 3 Sheets-Sheet 1

INVENTOR
Harry W. Jones.
BY Cameron, Kerkam + Sutton
ATTORNEYS

Jan. 20, 1953 H. W. JONES 2,626,069
COLLECTING, TRANSPORTING, AND DUMPING EQUIPMENT
Filed Sept. 26, 1949 3 Sheets-Sheet 3

INVENTOR
Harry W. Jones.
BY Cameron, Kerkam & Sutton
ATTORNEYS

Patented Jan. 20, 1953

2,626,069

UNITED STATES PATENT OFFICE 2,626,069

COLLECTING, TRANSPORTING, AND DUMPING EQUIPMENT

Harry W. Jones, Knoxville, Tenn., assignor to Dempster Brothers, Incorporated, Knoxville, Tenn., a corporation of Tennessee Application September 26, 1949, Serial No. 117,887

15 Claims. (Cl. 214—302)

This invention relates to equipment for collecting small accumulations of materials and transporting the collection to and dumping it at a disposal or storage point, and more particularly to a transporting and dumping vehicle provided with means for picking up in succession a plurality of small containers and dumping their contents into the vehicle. Such equipment is particularly adapted for the collection and removal of waste materials such as trash, garbage, and the like along street curbs and sidewalks, although it will be understood that the application of the invention is not restricted to this particular use.

Transporting and dumping vehicles are known in which a receptacle or container can be elevated along an upright skid frame at the rear end of the vehicle and supported on the skid frame while it is moved forwardly to bring the load over the rear axle and wheels of the vehicle in a suitable position for transportation. An example of such a vehicle is found in U. S. Patent No. 2,179,779 issued November 14, 1939 to George R. Dempster. The main object of the present invention is to provide such a vehicle with additional means whereby relatively small loaded containers located at intervals along a curb, sidewalk, or the like can be picked up in succession and dumped into the main container or receptacle of the vehicle itself.

Another object is to utilize the longitudinally movable skid frame, in conjunction with suitable hoisting equipment, for picking up and dumping the small loaded containers.

A further object is to provide means for dumping the small containers automatically into the large container or receptacle without releasing them from the hoisting means so that the loaded containers can be picked up at the side of the vehicle, swung into position over the receptacle and dumped, and the empty containers then swung back and dropped at the side of the vehicle.

A still further object is to insure that the loaded containers will always swing in from the side of the vehicle to the correct dumping position over the receptacle, but not beyond.

Other objects will appear more fully hereinafter as the description of the invention proceeds.

One embodiment of the invention has been illustrated in the accompanying drawings, but it is to be expressly understood that said drawings are for purposes of illustration only and are not to be construed as a definition of the limits of the invention, reference being had to the appended claims for this purpose.

Figure 1:
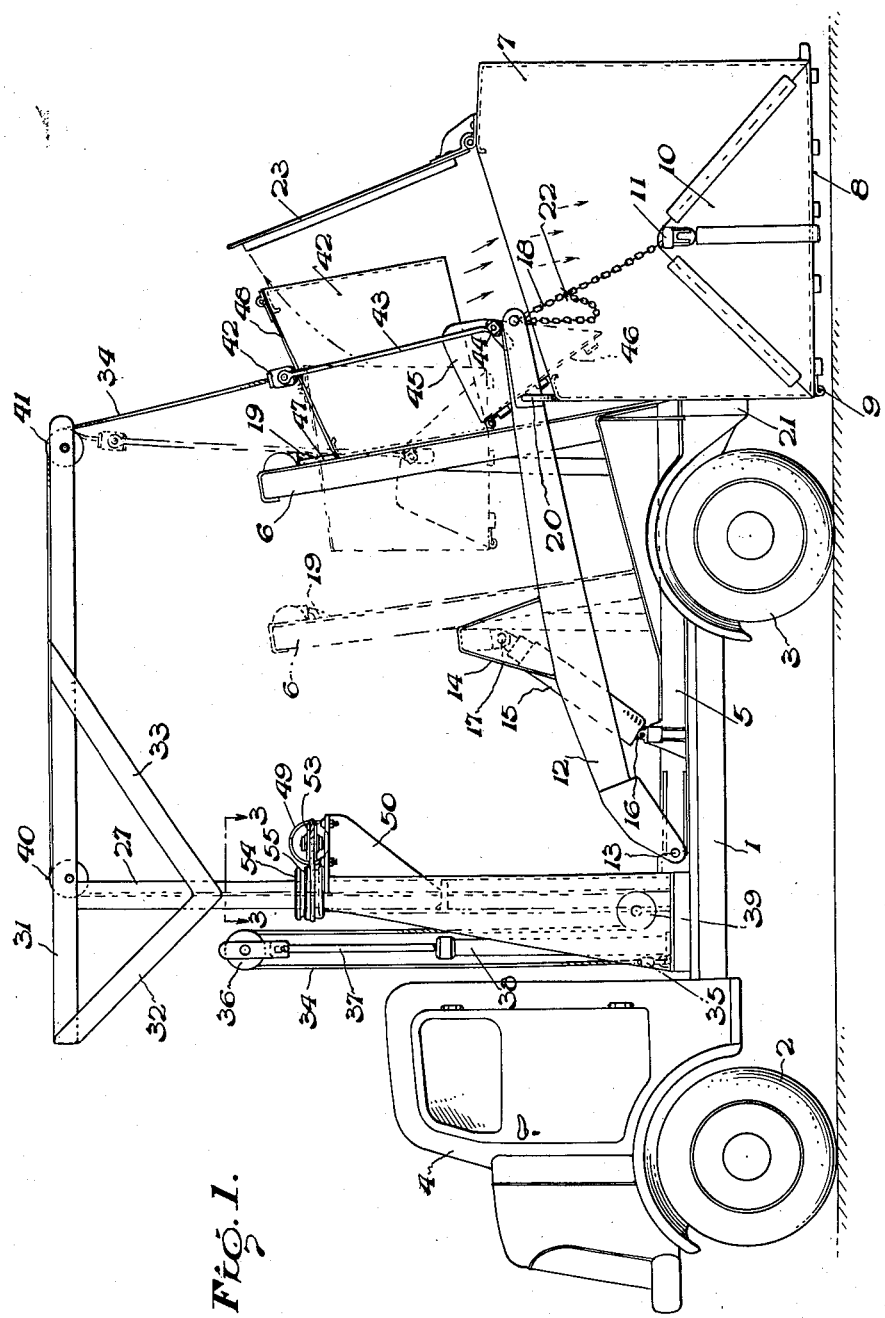
Fig. 1 is a side view of a transporting and dumping vehicle embodying the invention.
Figure 2:
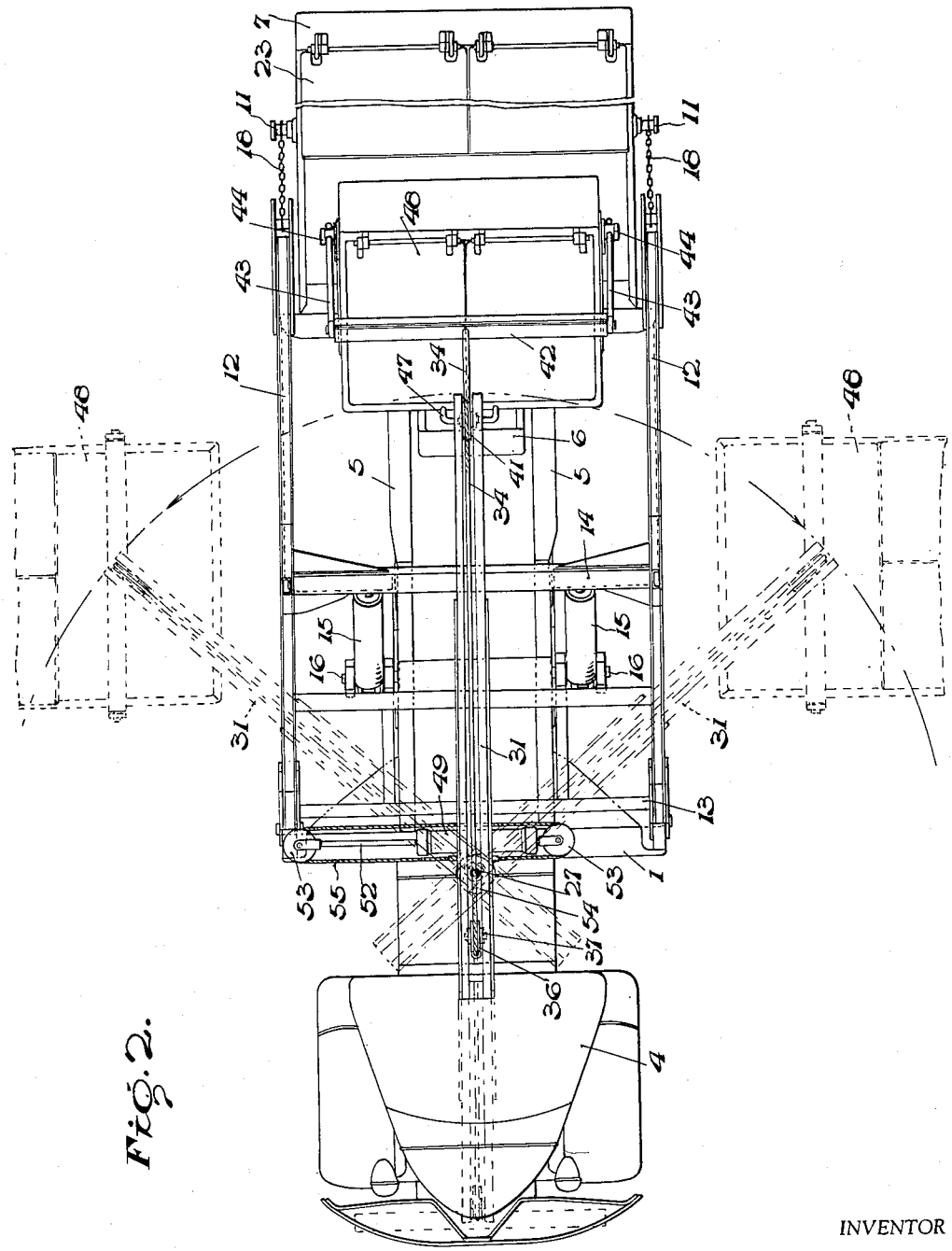
Fig. 2 is a plan view of the vehicle.
Figure 3:
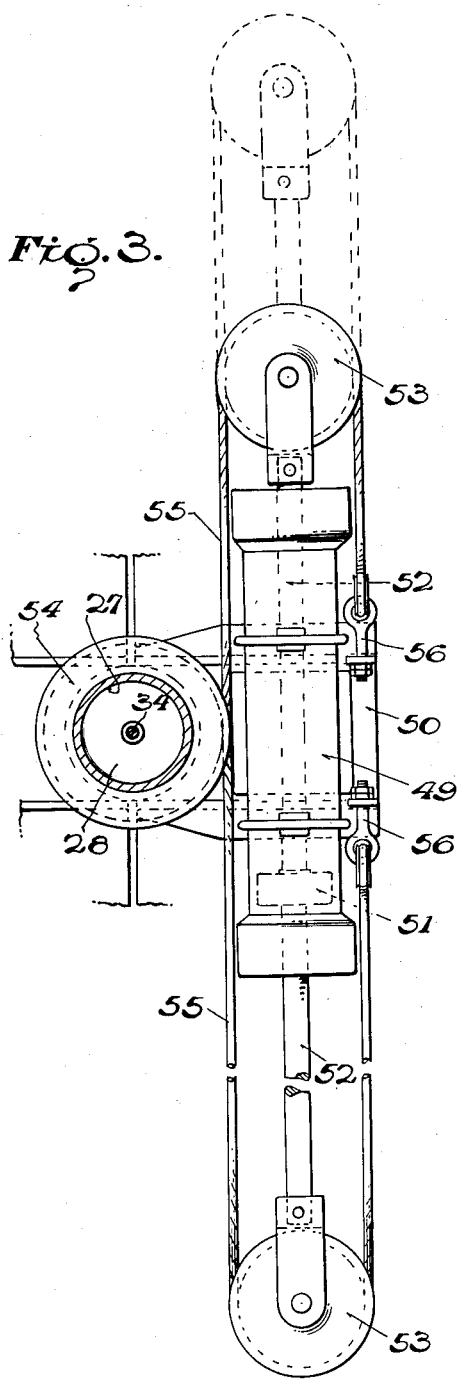
Fig. 3 is a detail showing means for swinging the container-hoisting mechanism.
Figure 4:
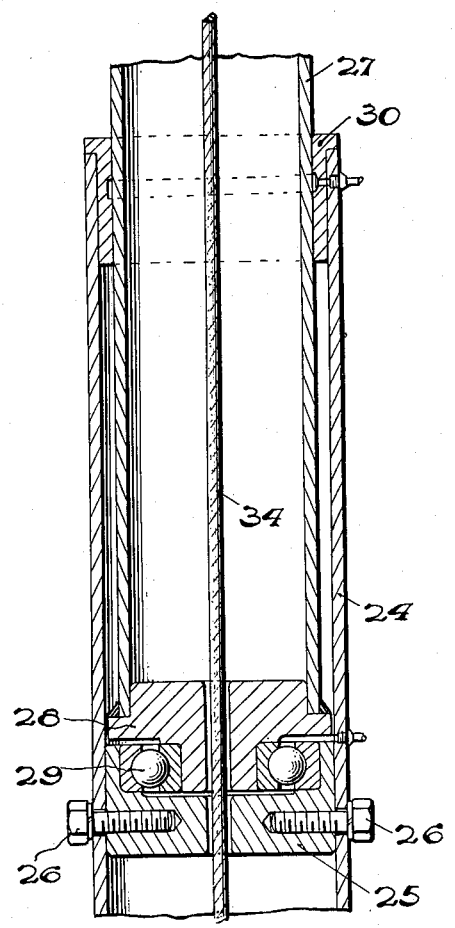
Fig. 4 is an enlarged section of part of the hoisting mechanism.

In the form shown, the vehicle itself is of the general type illustrated in the aforesaid Dempster patent. The vehicle chassis 1 is supported on front wheels 2 and rear wheels 3 and carries a driver's cab 4 at its forward end. Mounted longitudinally along the sides of the chassis 1 to the rear of the cab are spaced guide rails 5 forming a longitudinal slide for an upright and preferably forwardly inclined skid frame or carriage 6. Any suitable means, such as the hydraulic cylinder illustrated and described in the aforesaid patent, can be provided for moving the skid frame longitudinally in the slide 5, 5 between a position at the rear end of the vehicle as shown in full lines in Fig. 1 and a forward position as shown in dotted lines in the same figure.

A large receptacle or container 7 of any suitable type is carried at the rear end of the vehicle in position to be loaded as hereinafter described. This receptacle is of the drop-bottom type, having a bottom 8 hinged at 9 and provided with upwardly turned flanges or sides 10 and lugs 11 thereon whereby the bottom can be held closed and the container lifted. A pair of boom arms 12 are pivoted to the chassis 1 at 13 and are cross-connected by framework 14 to form an integral boom unit. Suitable power means such as one or more hydraulic cylinders 15 are employed for swinging the boom 12, said cylinders each having one end pivoted to the vehicle chassis at 16 and the other end pivoted at 17 to the framework 14. Lifting chains 18 carried at the ends of the boom are connected with the lifting lugs 11 of the receptacle. As described in the aforesaid patent, extension of the cylinder 15 swings the boom upwardly and lifts the receptacle along the skid frame 6, the frame being then moved forwardly to the dotted line position shown in Fig. 1 and the container deposited on the vehicle chassis for transportation. Near the top of the frame is a suitable automatic hook 19, which may be of the type described in U. S. Patent No. 2,404,830, whereby the receptacle can be suspended by its bail 20 for dumping purposes.

When the receptacle is being loaded as hereinafter described, however, it is suspended from the boom 12 in the position shown in Fig. 1, resting against the lower skid extension 21 with its bottom 8 clear of the pavement on which the vehicle travels. For this purpose the lifting chains 18 can be shortened by the use of grab hooks 22 or the like. If the receptacle is provided with a top such as shown at 23, moreover, the top is held open during loading in any suitable manner.

As stated above, the vehicle is also provided with means for hoisting relatively small loaded containers from the ground at the side of the vehicle and for swinging these containers inwardly to a dumping position over the open mouth of the receptacle 7. As each suspended container swings inwardly, the skid frame 6 occupies the dotted line position shown in Fig. 1 so that it is out of the way of the swinging container, but thereafter the skid frame is again moved rearwardly into engagement with the suspended container so that the container can be engaged with and supported by the hook 19 at its forward side and is then dumped by further lowering of the hoisting means.

The hoisting means employed for the above purposes can take any suitable form. In the form shown, a hollow vertical mast 24 is mounted on the vehicle chassis just rearwardly of the cab 4. At a suitable point in the height of this mast, a bearing support 25 is secured therein by suitable means such as the screws 26. The lower end of a rotatable mast section 27 telescopes within the upper end of the hollow mast 24, the lower end of this rotatable mast section being closed by a plug 28 and supported by a suitable antifriction bearing 29 interposed between it and the bearing support 25. At the upper end of the mast 24, the rotatable mast section 27 is guided by bushings 30. A horizontal jib boom 31 is secured to the top of the rotatable mast 27, being suitably braced as by means of braces 32 and 33, and carries a suitable hoisting means preferably comprising a power actuated cable 34. One end of the cable is anchored to the vehicle chassis at 35, the cable thence running over a vertically movable sheave 36 carried by the piston rod 37 of a hydraulic cylinder 38, and thence downwardly and under a stationary sheave 39 mounted in the lower end of the hollow mast 24. From the sheave 39, the cable 34 runs upwardly through the hollow mast and through suitable openings in the support 25 and plug 28 to a sheave 40 at the top of the mast and thence horizontally along the boom 31 to a further sheave 41 at the end of the boom.

The small pickup containers 42 may be of any suitable type adapted to discharge their contents into the receptacle 7 as hereinafter described. These containers are suspended one by one from the cable 34 in any suitable manner as by means of a spreader bar 42 to which the cable is attached, the ends of the spreader bar having chains or cables 43 adapted to be connected to lugs 44 on the sides 45 of pivoted drop-bottoms 46 of the containers. Thus when the cables 43 are connected to the lugs 44 of a loaded container and the piston rod 37 is extended, the cable 34 is hauled in to lift the container from the ground, meanwhile holding its bottom 46 closed. The travel of the piston rod 37 need be only one third of the lift of the container itself.

The container is also provided with means such as a bail 47 similar to the bail 20 so that it can be engaged with and supported by the hook 19 of the skid frame as hereinafter described. The top of the container is preferably closed by means of a hinged cover 48.

The mast 27 and boom 31 are preferably capable of rotation throughout a complete circle of 360° so that the boom, when not in use, can be turned 180° from the position shown in the drawings and extend forwardly over the cab 4, but can be swung from this position to either side of the vehicle for picking up containers and to the dumping position shown in the drawings. Any suitable means can be employed for swinging the mast and boom, but they are preferably actuated by power means such as a hydraulic cylinder. Moreover, said actuating means are preferably such that the limiting position thereof, as the boom swings from either side of the vehicle toward the dumping position shown in the drawings, corresponds to the position of the boom at which the container 42 is in the desired dumping position.

Thus it is only necessary to start the operation of the swinging means and allow it to take its full course, the stopping of the container in proper dumping position being automatically insured.

In the form shown, a hydraulic cylinder 49 is mounted at one side of the rotatable mast 27 in a horizontal position as by means of suitable brackets 50. The cylinder is pivoted with a suitable piston 51 and with piston rods 52 extending out through the opposite ends of the cylinder and each carrying a cable sheave 53 at its outer end. A cable drum 54 is secured to the rotatable mast section 27, preferably just above the upper end of the stationary mast section 24, and the intermediate portion of a cable 55 is wound around the drum 54 with a suitable number of turns, the ends of this cable running around the sheaves 53 and thence to anchorage points 56 on the brackets 50. The diameter of the drum 54 is proportioned to the movement of the piston 51 so that the full stroke of the piston from one end to the other of the cylinder produces rotational movement of the mast and drum of 360°. The parts are so adjusted that the central or neutral position of the piston in the cylinder corresponds to the forward inoperative position of the boom 31 during transportation. The full stroke of the piston from its neutral position to either end of the cylinder therefore produces 180° rotation of the mast and boom in one or the other direction, and the limiting position of the piston 51 at the end of its stroke always brings the boom to its rearward or dumping position, the suspended container stopping automatically above the receptacle 7.

With the suspended container in this position, as shown in dotted lines in Fig. 1, the skid frame 6 is now moved rearwardly into engagement with the container, swinging it rearwardly over the open mouth of the receptacle 7. When the bail 47 is engaged with the hook 19 and the cable 34 is slacked off, therefore, the container drop-bottom 46 opens, discharging the container load into the receptacle. Then the piston rod 37 is again extended to close the bottom 46 and lift the container 42 off of the hook 19, after which the skid frame 6 is moved forwardly, the boom 31 is swung outwardly to the appropriate side of the vehicle, and the empty container is dropped to the ground and the cables 43 disengaged from the lugs 44. The vehicle then moves forwardly along the curb to the next container, and so on.

Once the receptacle 7 has been filled, it is lifted onto the vehicle by means of the skid frame 6 and boom 12 as described above and the load is hauled to the desired dumping point at which it is discharged by engaging the bail 20 on the hook 19 of the skid frame and slacking off or lowering the boom 12 to release the drop-bottom 8.

It will be understood that the invention is not restricted to the particular embodiment described in detail above and illustrated in the drawings, but is capable of various embodiments, and that equivalent parts can be substituted for those shown and changes made in the form, details of construction, and arrangement of the parts, all without departing from the spirit of the invention. Reference should therefore be had to the appended claims for a definition of the limits of the invention.

What is claimed is:

1. In transporting equipment, the combination of a vehicle and a receptacle carried adjacent the rear end thereof, a dump container, a boom pivoted on said vehicle and having hoisting means thereon for picking up said container at one side of the vehicle, said boom and the elevated container being swingable to a position above said receptacle, an upright frame movable forwardly on said vehicle out of the path of the swinging container and then movable rearwardly into engagement with said container at said position, and means on said frame for engaging and supporting said container above said receptacle when said hoisting means is lowered to dump the contents of said container into said receptacle.

2. Transporting equipment as defined in claim 1, including a second boom for supporting said receptacle, and means for lifting said second boom to elevate said receptacle relative to said frame in its rearward position for engagement with said supporting means.

3. Transporting equipment as defined in claim 1, including power means for swinging said boom and container, the limit of the effective stroke of said power means corresponding to the position of said boom when said container is above said receptacle for dumping.

4. Transporting equipment as defined in claim 3, including a power-actuated boom-swinging member movable in both directions from a neutral position to limiting positions both of which correspond to the position of the boom when the container is above said receptacle for dumping.

5. In transporting equipment, the combination of a vehicle and a receptacle carried adjacent the rear end thereof, a dump container of the drop-bottom type, a boom pivoted on said vehicle and having hoisting means for engaging the drop-bottom of said container to pick it up at one side of the vehicle and hold it closed while suspended, said boom and the suspended container beinging swingable to a position above said receptacle, an upright frame movable forwardly on said vehicle out of the path of the swinging container and then movable rearwardly into engagement with said container at said position, and means on said frame for engaging and supporting said container when said hoisting means is lowered whereby said drop-bottom opens to dump the contents of the container into said receptacle.

6. Transporting equipment as defined in claim 5, including a second boom for supporting said receptacle, and means for lifting said second boom to elevate said receptacle along said frame in its rearward position and into engagement with said supporting means.

7. In transporting equipment, the combination of a vehicle and a receptacle carried adjacent the rear end thereof, a dump container of the drop-bottom type, a boom pivoted on said vehicle and having hoisting means including a cable for engaging the drop-bottom of said container to pick it up at the side of the vehicle and hold it closed while suspended from said boom, means for swinging said boom between a position at one side of the vehicle and a position in which said container is suspended above said receptacle, an upright frame movable forwardly out of the path of the suspended container as it moves to said position and then movable rearwardly into engagement with said suspended container at said position, and means on said frame for engaging and supporting said container when said cable is slacked off whereby said drop-bottom opens to dump the contents of the container into said receptacle.

8. Transporting equipment as defined in claim 7, including power means comprising a hydraulic cylinder for operating said hoisting cable.

9. Transporting equipment as defined in claim 8, including a hollow vertical mast mounted on the vehicle chassis and having a rotatable section on which said boom is mounted, a stationary cable sheave at the bottom of said mast, a vertically movable cable sheave at one side of said mast, said cable running from the end of the boom down through the hollow mast, under said stationary sheave and over said movable sheave, and down to the chassis with its end anchored thereto, said vertically movable sheave being actuated by said hydraulic cylinder.

10. Transporting equipment as defined in claim 7, including a vertically rotatable mast on which said boom is mounted, and power means for swinging said boom comprising a hydraulic cylinder and a piston movable therein, and mast-rotating means actuated by said piston.

11. Transporting equipment as defined in claim 10, the limiting positions of said piston at the ends of said cylinder both corresponding to the position of said boom when said container is in dumping position over said receptacle.

12. Transporting equipment as defined in claim 11, said piston having a piston rod extending out each end of the cylinder, a cable sheave on the end of each rod, a cable drum on said mast, and a continuous cable having an intermediate portion wound on said drum and running therefrom around said sheaves, the ends of the cable being fixed.

13. Transporting equipment as defined in claim 12, the diameter of said drum and the stroke of said piston being coordinated so that the full stroke of said piston between said limiting positions corresponds to a rotation of 360° of said mast.

14. In transporting equipment, the combination of a vehicle having an upright skid adjacent its rear end, the lower portion of said skid being fixed to the vehicle and its upper portion comprising a frame movable forwardly and rearwardly on said vehicle, a receptacle, means for elevating said receptacle and holding it in elevated position against the fixed portion of said skid, a dump container, a boom pivoted on said vehicle and having hoisting means thereon for picking up said container, said boom and the elevated container being swingable to a position above said receptacle and said frame being movable forwardly out of the path of the swinging container and then rearwardly into engagement with said container at said position, and means on said frame for engaging and supporting said container whereby its contents can be dumped into said receptacle by lowering said hoisting means.

15. Transporting equipment as defined in claim 14, said elevating means lifting said receptacle along said frame into engagement with said supporting means thereon whereby the contents of said receptacle can be dumped from said vehicle.

HARRY W. JONES.

REFERENCES CITED

The following references are of record in the file of this patent:

UNITED STATES PATENTS

| Number | Name | Date |
|---|---|---|
| 377,183 | White | Jan. 31, 1888 |
| 677,874 | Macbeth | July 9, 1901 |
| 693,844 | Dempsey | Feb. 25, 1902 |
| 705,718 | Thiele | July 29, 1902 |
| 841,465 | Stauffer | Jan. 15, 1907 |
| 1,295,849 | Carr | Mar. 4, 1919 |
| 1,317,696 | French | Oct. 7, 1919 |
| 1,521,246 | Lichtenberg | Dec. 30, 1924 |
| 1,551,426 | Pavella | Aug. 25, 1925 |
| 1,874,189 | Howard | Aug. 30, 1932 |
| 2,020,231 | Bell | Nov. 5, 1935 |
| 2,179,779 | Dempster | Nov. 14, 1939 |